United States Patent Office 3,503,841
Patented Mar. 31, 1970

3,503,841
FOAMED POLYSTYRENE BONDED TO FIBER FILLED POLYVINYL CHLORIDE SHEET
Robert W. Sterrett, Chicago, Ill., assignor to W. R. Grace & Co., New York, N.Y., a corporation of Connecticut
No Drawing. Filed May 13, 1966, Ser. No. 549,802
Int. Cl. B32b 5/18, 17/10, 27/30
U.S. Cl. 161—161
7 Claims

ABSTRACT OF THE DISCLOSURE

A lightweight sandwich structure having a low density core such as foamed polystyrene is constructed by the application, on one or both sides of the core, of a skin comprising a polyvinyl chloride sheet which is filled with asbestos fibers or mixtures of asbestos fibers with other fibers such as glass fibers.

---

This invention relates to light weight sandwich structures containing foamed or cellular plastic core material. By the term "sandwich" is meant a foamed material encased or covered on the top and bottom sides with a protective skin.

In summary our invention provides a polystyrene sandwich structure having a foamed core material of polystyrene and at least one skin of a polyvinyl chloride sheet filled with fibrous asbestos. In another embodiment of our invention, at least one skin is of a polyvinylchloride sheet filled with cellulosic fibers.

The rigid plastic foams have found wide and varied use in industry. For instance they can be used as core materials between skins of many and varied compositions. In aircraft construction the foam can be enclosed between aluminum or fiber glass reinforced plastic skins to form an assembly which is rigid, strong and yet remarkably light. Large panels having a low density core contained between light weight outer skins can be employed as complete structural units for wall or ceiling panels in fabrication and industrial buildings and structures. By suitable selection of the plastic core and outer skins, these panels can be fire retardant, excellent insulators, resistant to penetration or attack by moisture and fungi and provide a large strength to weight ratio so desirable in the construction industry.

By using the foregoing combination polystyrene foamed core and polyvinyl chloride skin, the sandwich structure is obtained that has superior properties. The greatest enhancement of properties results from using two such polyvinyl chloride skins. In the interest of economy it is sometimes desirable to prepare the sandwich panel with one polyvinyl chloride skin and one skin of a less expensive material such as plywood, light weight metal or commercial "wallboard." This procedure is particularly desirable in manufacturing exterior wall panels for building construction in which the polyvinyl chloride resin skins serves as the exterior weather resistant, fire resistant surface and the less expensive skin is used on the inside surface which is intended to merely serve as the base for a decorative coating of some type. Other materials can also be used on the second skin such as ceramics, fiber glass and plastics other than the polyvinyl chloride resins of the invention.

THE POLYSTYRENE FOAM CORE

The foams applicable in our invention are polystyrene foams which may be prepared using a number of methods. One possible way of preparing the foam is to utilize porous, cellular, individual particles of a styrene polymer which are still capable of expansion and hereinafter called "pre-expanded particles." Other substances may be coemployed in the production of the shaped articles but their presence in the porous shaped articles is not essential.

Styrene polymers as used in the sense of the present specification, include homopolymers and copolymers of styrene which contain at least 80% of a styrene such as styrene itself, alpha-methyl styrene, nuclear methylated styrenes or chloro styrenes. Copolymers of these styrenes with each other or with other monovinyl compounds such as acrylonitrile or acrylic acid esters can be used. Pre-expanded particles are obtained by heating particles containing raising agent to temperatures above the softening point of the styrene polymer and above the boiling point of the liquid raising agent contained therein.

The raising agents are in particular volatile aliphatic and cyclo aliphatic hydrocarbons such as pentane, hexane, heptane, cyclohexane, cyclopentadiene or mixtures of these hydrocarbons. The particles of polystyrene containing raising agent can be prepared by polymerization of the monomers forming the styrene polymers in the presence of said raising agents, for example by the bead polymerization method. Finely divided styrene polymers free from raising agent can however also be prepared and impregnated with the raising agents, the liquid agent thus being introduced after polymerization. The particles containing raising agents should as a rule have a particle size of 0.2 and 3 millimeters and contain as raising agents about 3 to 15 percent by weight (with reference to the total weight of the particles) of said raising agent.

The particles containing raising agent are preferably heated only for such a period with the liquid raising agent contained therein is not completely evaporated. There are thus formed porous cellular individual particles which are still capable of expansion. These pre-expanded particles can be prepared for example by heating the particles containing raising agent in hot water, with steam or with infrared radiation. In the case of polystyrene it is preferable to introduce the particles containing raising agent for about 3 to 10 minutes into hot water at a temperature between 75 and 100° C. When styrene polymers are used which have a high softening point, temperatures of between 100 and 120° C. can be used for the pre-expansion. between about 15 and 200 grams per liter. Since the expandability of such pre-expanded particles increases somewhat by storage before the second expansion, it is preferable to store the pre-expanded particles at room temperature for a period of a day to about 3 weeks. More detailed information regarding the pre-expansion for incomplete foaming-up of the particles containing raising agent is given in Patent No. 2,787,809.

In order to prepare the shaped articles of porous styrene polymers the contents of a mold which closes in a non-gas tight manner are heated to temperatures above the softening range of the styrene polymer present in the mold. The mold is then filled with the pre-expanded porous cellular particles of a styrene polymer which are still capable of expansion. The mold is then closed and during the heating the pre-expanded particles unite together and are hardened in the desired shape.

To carry out the invention in pracice, it is evident that the mold can produce a batch shape, that is the mold can be a closed discrete mold. On the other hand the polystyrene foam can be produced continuously, e.g., using a combination of continuous belts as is known in the prior art.

Various additives can be incorporated in the polystyrene to provide different properties. For instance, antimony oxide or a phosphorus acid such as alkyl acid phosphate can be used to improve fire resistance; fillers such as clay, calcium sulfate or ammonium phosphate can be added to lower costs and to improve density and fire resistance; ingredients such as dyes may be added for color; and fibrous glass, asbestos or synthetic fibers may be added for strength.

The finished polystyrene foam can be varying thicknesses for our application; preferably the thickness is ½ to 4 inches; operably from ½ to whatever thickness is suitable for the particular requirements. Generally the foam is no more than a few feet thick.

The width of the polystyrene can obviously be whatever is necessary. Generally, for insulation purposes, the polystyrene core is from 24 to 48 inches wide. It is also preferable to either tongue and groove or ship-lap the sides of the foam core.

THE POLYVINYL CHLORIDE SKIN

As aforesaid at least one skin of the sandwich structure of the invention comprises a thermoplastic resin preferably filled with a fibrous inorganic or organic filler. In addition, the skin may be described as a rigid sheet composed of a polymeric constituent and having fibers uniformly dispersed throughout; all of the fibers lying in, or substantially in, the plane of the sheet. The polymeric constituent is based predominantly on one or more of styrene, methylmethacrylate, acrylonitrile and polyvinyl chloride. In the simplest case the polymeric constituent may be a single polymer, e.g., polyvinyl chloride. It may also be a copolymer or terpolymer, e.g., of styrene and butadiene, the styrene predominating, or of an acrylonitrile butadiene and styrene terpolymer, the acrylonitrile and styrene together predominating. Again it may consist of a polymer mixture, a copolymer mixture, or a polymer-copolymer mixture. Examples of such mixtures are polystyrene mixed with a styrene/butadiene copolymer and polystyrene mixed with a copolymer of styrene and maleate ester.

It is of course well-known that by varying the proportions of the monomers in a copolymer, a product with different properties are obtained. Many copolymers of acrylonitrile and butadiene, for instance, are of a rubber-like nature and therefor flexible. Although the reinforcement is an important factor in imparting rigidity to the sheet, it is necessary to insure that if the polymeric constituent includes butadiene or another monomer which tends to give a flexible copolymer, the proportion of that monomer is so low that the polymeric constituents would, if not reinforced, be rigid or substantially rigid at room temperature.

It is desirable that in this sheet the proportion of the fiber should be as high as possible and it is advantageously at least 20 percent to 60 percent by weight. The polymeric constituent may be from 40 to 80% by weight of the total sheet. Preferably, the proportion of fiber to polymer is 50–50 by weight.

Inorganic fibers give better rigidity than organic fibers and it is therefore preferable that the fibers should be wholly or predominantly inorganic, say at least 90% inorganic. However, the fibers may operably be as low as 20% inorganic, and up to 80% organic.

For maximum strength fibers should be as long as possible but not so long that they do not lie substantially in the plane of the polymer sheet. It is highly desirable that the inorganic fibers should contain a proportion of asbestos fiber and asbestos preferably constitutes from 20 to 100 percent by weight of the total filler. Glass fibers are also suitable and advantageously a mixture of asbestos and glass is used. It has been found that "open" asbestos fibers of average length from 0.15 to 0.20 inch and chopped stapled glass fibers from 0.5 to 1.0 inch are preferable. Mixtures of short fibers with varying proportion of longer fibers, say, up to 2 inches operably may also be used and their use makes it possible to increase the strength properties without materially reducing the moldability. The longer fibers may be asbestos, glass or organic. The term "organic fibers" includes wood flour, ground wood, wood fibers, cellulose material, short cut textile fibers of vegetable and animal origin, leather waste reduced to fine fibers or similar hydrophil and compressible products.

These organic fibers are preferably 0.15 to 1 inch long, and operable up to 2 inches long. Broadly, there may be from 80 to 100 percent fibers less than 1 inch long and from 20% to 0% fibers between 1 and 2 inches long.

These filled thermoplastic sheets may be manufactured by various methods.

One method that is particularly applicable for making sheets uses a normal Fourdrinier paper machine. The chosen fibers in dilute suspension are mixed with a stabilized aqueous dispersion of a dried fine-particle size polyvinyl chloride powder, predispersed into a slurry; beaten, and precipitated on by use of an alum. Plasticizers and other additives and pigments may or may not be added to the mass. The material is then sheeted as in the regular manner, and the resin is thereafter fluxed. A filled polyvinyl chloride formed in this way contains strong fiber to fiber bond which is not disturbed by the subsequent fluxing of the polymer, and it is not subject to "cold flow." These sheets can be used as former, or preferably several sheets, from 1 to 20 can be welded together by heat and pressure to form a homogeneous material.

Another eminently suitable method comprises converting the polymeric constituent in liquid form and the fibers into a substantially homogeneously dough-like mass, building up the mass continuously in laminations onto a sheet on a hot calender roll, cutting the sheet thus formed on the roll, and removing it from the roll, and allowing it to cool to a rigid sheet.

This method is advantageous in that calendering the dough-like mass to sheets causes little or no degradation of the fibers to take place and leads only to a little alignment of the fibers, thus avoiding pronounced uni-directional strength. If, however, uni-directional strength is required some continuous glass filament such as those produced by spinning a large number of monofilaments together may be fed into the nip of a calender to extend throughout the length of the resultant sheet at the expense of some loss of moldability.

Since the dough-like mass is laid down on the calender roll in thin laminations which are much shorter in depth than the fiber length, no fibers can be oriented in a direction perpendicular to the sheet and they all must lie substantially in the plane of the sheet. Not all the fibers will be exactly in this plane, since there is bound to be some tilting of fibers within the individual laminations on the calender roll. However, it can be readily appreciated that as the laminations are much thinner than the length of the fibers, this tilting will be very small. For example, if the fiber length is 0.15 inch and each lamination is 0.4 thousandths of an inch thick, the fibers can only lie at an angle up to about 9 minutes to the plane of the sheet. This is negligible angle.

The sheet as it comes from the calender may contain voids and some residual volatile constituents which may spoil the physical properties, translucency and general appearance. If so, it may be reheated and pressed to densify and polish it. This is preferably done in a hydraulic press but may be done by passage through hot and cold rolls.

By the phrase "polymeric constituent in liquid form" is meant a plastisol composition, i.e., a polymer dispersion in a plasticizer, the proportion of plasticizer being high enough to be the sole dispersion medium. Particularly well known in the art are the various polyvinyl chloride plastisols.

The amount of plasticizer which may be employed is not too critical so long as the proportion used is sufficient to impart the desired degree of plasticity to the finished product. Generally the amount of plasticizer ranges from about half to an equal amount by weight of the vinyl chloride resin.

Various commercial plasticizers known to be suitable for use with the vinyl chloride resins may be satisfactorily used in the plastisol compositions herein described. These plasticizers include dioctylphthalate, trioctylphosphate, tricresyl phosphate, acetyl tributyl citrate, diphenyl octyl phosphate, dioctyl chloromethane phosphonate, etc.

Polyvinyl chloride polymers and the various copolymers of vinyl chloride and vinyl acetate, exemplify the various vinyl chloride resins which are suitable for use in various plastisol compositions.

In addition to the plasticizer, the vinyl chloride plastisol may also contain a large number of different compounds such as the barium, cadmium and tin salts of certain carboxylic acids which have been used as heat and light stabilizers for vinyl chloride resin compositions. Other stabilizers, colorants, dyes, solvents, flame retardants, etc. can be used as the requirements of the finished product dictate.

PRODUCING THE SANDWICH STRUCTURE

In one embodiment of the procedure of the invention, the foam, bottom skin, and top skin are laminated by means of suitable adhesives. If the adhesive is heat settable, heat is applied either directly to the top and bottom skin or indirectly by convected hot air. The equipment used may be conventional laminating apparatus. If the adhesive does not require heat or pressure to set it, as when various epoxies are used, the adhesive can be spread on as required and allowed to cure as directed.

In another embodiment the procedure can be applied to a continuous production of such sandwich structure in suitably adaptable equipment. For continuous production it is evident that the foam should have been continuously produced and the skins also on endless rolls fed into some sort of a laminating apparatus.

It is also within the scope of this invention to produce the sandwich structures in situ, that is feeding the bottom skin into the mold and depositing the pre-foamed beads onto the bottom skin and mounting the top skin. When heat is applied, the foam in expanding will cure the whole into a rigid and light-weight foam structure. Expansion at the edges of the structure can be limited by a restraining surface during the expansion process. The internal pressure of the expanding pre-foam forces the skins and foam into the control dimensions of the structural mold while the foam is curing and forming a strong adhesive bond to the skins. Of course, a suitable adhesive substance can be applied to the skins before foaming. The result is a light weight fire resistant sandwich structure of controlled dimensions requiring no additional fabricating. This procedure can also be applied to the continuous production of a sandwich structure.

To effect and complete foaming in situ, heat is applied. This heat could be supplied either by dielectric heating or by a combination of conductive and convective heating. The upper and lower surfaces of the sandwich are retained between platens which may be suitably heated for temperature control. The formed sandwich is conveyed continuously from the foaming zone to the curing zone. The desired temperature is maintained by suitably heated rigid platens. The cured sandwich structure passes through cool platens before it discharged to a cutting knife. As it discharges it is cut into finished sections to produce a finished structure of the desired dimensions.

The following examples serve further illustrate the present invention and the improvements resulting therefrom.

Example 1

Five parts by weight of asbestos fiber, 80% of which had an average length from 0.15 to 0.20 inch and 20% of which had an average length of 0.20 to 2 inches were mixed for 15 minutes with 5 parts by weight of a 50% polyvinyl chloride plastisol in dioctylphthalate as the plasticizer (of 50% weight/weight content) in a mixer fitted with central rotating spiked bars. When the fiber was thoroughly wet, mixing time was continued for 30 minutes. After this time mixing was continued for a further 30 minutes to make a total of 75 minutes.

The dough-like mass produced was transferred to a nip of a calender. The calender can be of the type comprising a large steam heated roll and a smaller water cooled roll which can be moved apart from one another. The dough-like mass is fed into the nip of the calender and at the end of each revolution, the distance between the roll is increased so that the mass is built up in laminations on the hot roll to required thickness.

A sheet was formed on the large roll maintained at 140° C. by opening the nip at a rate of 0.0004 inch per revolution, this being effected by means of a ratchet-and-pawl arrangement. Final densification and polishing were effected by heating the calendered sheet in an oven at 150° C. for 5 minutes and pressing ¼ ton per square inch for 1 minute in a hydraulic press fitted with water cooled platens. The final sheet measured approximately 0.06 inch, although the dimensions could range from 0.1 to 0.001 inch.

A polystyrene foam core had previously been prepared being about 1 inch thick and about 48 inches wide having tongue and groove sides. To both sides of this core product was hand laminated the sheet as produced above by means of a room temperature curing epoxy adhesive.

Example 2

40 parts of the abestos fibers as described in Example 1 were wetted with 130 parts of the polyvinyl chloride plastisol described in Example 1 in a mixer and then 30 parts of ½ inch (average length) chopped glass roving were worked into the mass. The mass was formed into a sheet as in Example 1.

Following this the sheet was laminated to a polystyrene foamed core using the process described in Example 1.

Example 3

On hundred (100) parts of a polyvinyl chloride having a particle size smaller than 10 microns is emulged at 70–75° C. with 2.5 parts of lead sterate and 2.5 parts stearic acid to form a latex having about 50% solid content.

One thousand (1000) parts of a pure bleached cellulose material (finely ground paper mass having a fiber size of less than 0.2 inch) is emulged with 100 parts of dioctyl phthalate in which has previously been dissolved 3 parts of a water soluble condensation product of ricinoleic acid and ethylene oxide. The paper mass is neutralized and 1000 parts of cellulose material and 3.5 parts caustic soda is added in form of a diluted solution.

1800 parts of the above polyvinyl chloride resin are then added and thoroughly homogenized by using a propeller stirring device.

Upon achieving homogenization, the pH of the mixture is brought to 5.5–6.0 by admixture of a diluted aluminum sulfate solution and finally the cellulose content of the mixture is adjusted to about 0.1–0.2% by adding of water.

This fiber mass may be worked on a paper machine in conventional manner and without the slightest difficulties to a "paper length." Several of these paper lengths are arranged in superposed position prior to subjecting the same to pressure, at about 160° C. and 80 kg./cm.$^2$, for instance in a press or on a calendar, and they are welded together during the pressure or calendar process to a completely homogeneous transparent material showing no pigment colors.

Two of these sheets, having a final thickness of about 0.08 inch were then laminated to both sides of a polystyrene foam core, prepared as in Example 1, by use of a room temperature, curing epoxy adhesive.

Example 4

The general procedure of Example 3 was followed, except that about 50% of the cellulose fibers were replaced by fine abestos fibers having average lengths as in Example 1. The final sheets were pressed at 160° C. and 120 kg./cm.² and laminated to a foam core as in Example 3.

What is claimed is:

1. A sandwich structure which comprises two protective skins in spaced-apart relationship and contained between said skins and adhering directly to the inner surface thereof, a polystyrene foam; at least one of said skins comprising a polyvinyl chloride resin having filled therein from about 20 to about 60% by weight of the skin of a fibrous filler chosen from the group consisting of asbestos, glass, cellulose, a mixture of asbestos and glass, and a mixture of asbestos and cellulose fibers, said fibers having a length of less than two inches and lying substantially in the plane of the skin.

2. The sandwich structure of claim 1 wherein the fibrous filler content of the skin is about 50% by weight of the skin.

3. The sandwich structure of claim 1 wherein the fibrous filler is asbestos fibers.

4. The sandwich structure of claim 3 wherein the asbestos fibers are 0.15 to 0.20 inch long.

5. The sandwich structure of claim 1 wherein the fibrous filler is a mixture of asbestos and glass fibers.

6. The sandwich structure of claim 5 wherein the asbestos fibers are 0.15 to 0.20 inch long and the glass fibers are 0.5 inch long.

7. The sandwich structure of claim 1 in which the polyvinyl chloride contains fifty percent by weight asbestos fibers of average length from 0.15 to 0.20 inch.

References Cited

UNITED STATES PATENTS

| | | | |
|---|---|---|---|
| 3,043,730 | 7/1962 | Adie | 161—161 |
| 3,133,825 | 5/1964 | Rubens | 161—195 |
| 3,284,260 | 11/1966 | Best | 161—161 |
| 3,338,994 | 8/1967 | Heron | 161—170 |

ROBERT F. BURNETT, Primary Examiner

WILLIAM J. VAN BALEN, Assistant Examiner

U.S. Cl. X.R.

156—79; 161—162, 170, 195, 204, 205, 249